Figure 1:
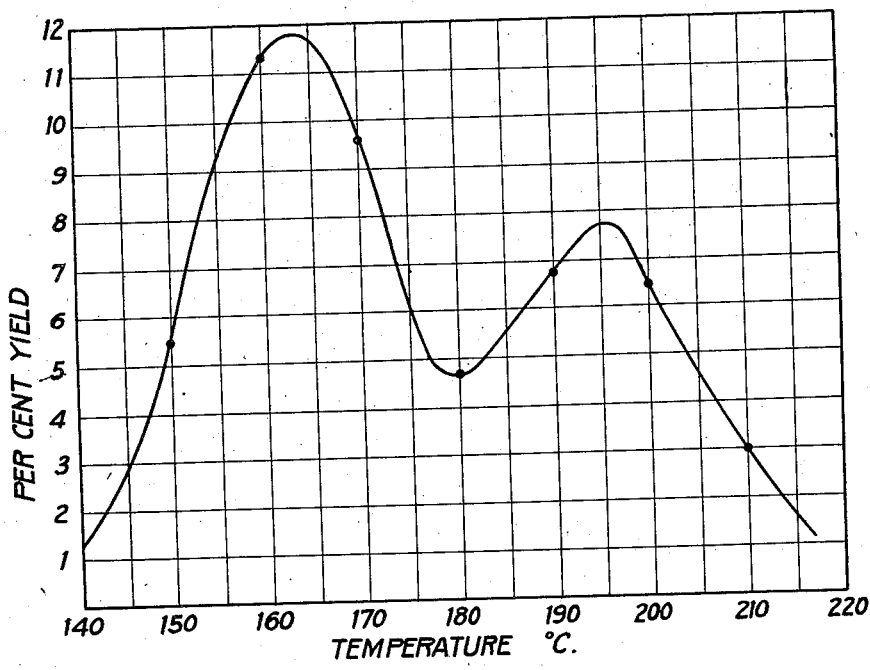

May 23, 1944.　　K. C. D. HICKMAN ET AL　　2,349,272
TOCOPHEROL PREPARATION
Filed Sept. 25, 1940

KENNETH C.D. HICKMAN
NOEL H. KUHRT
INVENTORS

BY
ATTORNEYS

Patented May 23, 1944

2,349,272

UNITED STATES PATENT OFFICE 2,349,272

TOCOPHEROL PREPARATION

Kenneth C. D. Hickman and Noel H. Kuhrt, Rochester, N. Y., assignors to Distillation Products, Inc., Rochester, N. Y., a corporation of Delaware Application September 25, 1940, Serial No. 358,270

4 Claims. (Cl. 260—333)

This invention relates to the recovery or purification of tocopherol and in particular relates to a method whereby loss during recovery or purification treatment is considerably lessened.

Three varieties of tocopherol are known to exist—alpha, beta, and gamma. Each of these is quite easily oxidized, the oxidation passing through several stages at one of which a quinone is present. Although some authorities claim that the quinone form has the full vitamin E activity of the hydroquinone all recognize that it is readily and irreversibly oxidized to a substance which has no activity.

During synthetic preparation of tocopherols and during purification of tocopherols from natural sources it is convenient or necessary to extract, distill, esterify, saponify, or use similar procedure to effect a satisfactory separation or purification. During such processes, and particularly during saponification or neutralization, any tocopherols which are present will partly become irreversibly oxidized with a resulting high loss of the original tocopherol contained in the mixture being treated.

This invention has for its object to provide purification or recovery procedure whereby the foregoing difficulties are substantially lessened. Another object is to provide a method for recovering or purifying tocopherol wherein the tocopherol is prevented from being oxidized to an inactive form. Another object is to improve the yields of tocopherol purification or recovery processes. Another object is to improve the state of the art. Other objects will become apparent from the following description and claims.

These and other objects are accomplished in accordance with our invention, which includes subjecting the tocopherol-containing material to a reducing treatment during the purification or recovery treatments. In this way the tocopherol is kept substantially entirely in a useful or active form during operations which would otherwise cause conversion to an inactive substance.

In the following description we have set forth several of the preferred embodiments of our invention, but it is to be understood that these are given for the purpose of illustration and not in limitation thereof.

Examples of suitable powerful reducing agents are zinc dust, in conjunction with acid or alkali. Other metals than zinc which give rise to nascent hydrogen in the presence of acids, such as acetic, hydrochloric, sulphuric, or alkalies, such as sodium hydroxide can be used. Examples of such metals are aluminum, iron, and tin. Metallic sodium may be used in conjunction with a suitable reactant to give nascent hydrogen. For instance, sodium reacts in the presence of alcohol to form sodium ethylate and nascent hydrogen. Sodium hydrosulphite ($Na_2S_2O_4$) and phosphite, stannous chloride and like powerful reducing agents are satisfactory. Catalytic hydrogenation may be used. The pressure may be atmospheric or higher such as 200 ats. Usual hydrogenation catalysts such as nickel, copper or nickel chromite, platinum, palladium, etc., can be used. The temperature should be below 300° to prevent thermal decomposition.

The important thing is to maintain the tocopherol oxidation products in the reduced form and prevent conversion to irreversible or difficultly reversible forms. This does not necessarily mean that active reduction must take place during each second of the purification or recovery treatment. It is perfectly feasible to apply the reduction intermittently or continuously during the stage of the operations in which active oxidation is likely to take place.

Tocopherol is recovered from natural materials of the nature of vegetable oils by saponification and solvent extraction. Also tocopherol can be prepared by synthetic means. In Hickman application 321,913, filed March 2, 1940, there is described new source materials for tocopherol comprising sludges, scums, and other volatile by-products derived from vegetable and animal oils during carrier gas and like refining or deodorizing treatment thereof. The tocopherol is recovered from these by-products by various methods, such as acidification followed by high vacuum, unobstructed path distillation, saponification, solvent extraction of the saponification mixture, followed by distillation of the non-saponifiable extract and like procedure. Our invention is applicable to the recovery or purification of tocopherol from these sources and to all methods of purification or recovery of tocopherol in which oxidation to the irreversible form can take place.

EXAMPLE I

*Recovery of free tocopherol hydroquinone from crude deodorizer "clabber stock" (the volatile matter recovered from the steam employed in the deodorization of a vegetable oil such as hardened corn oil)*

Ten per cent zinc dust is stirred into the melted or partly melted crude clabber stock which contains about 2.3% tocopherol. After thoroughly incorporating, sufficient alcoholic caustic soda of 40 per cent strength is added and the mixture stirred and heated or allowed to warm spontaneously to achieve complete saponification which is accomplished in about one hour. A convenient amount of alkali is 200 per cent of that required to saponify the fat, supposing that the entire clabber stock is glyceride. An hour or more after the addition of alkali, the reduction of tocopherol is complete and the saponified mixture sets solid so that all but the surface layers are protected from the action of air. The mass is then broken up and extracted with a tocopherol solvent such as ether or petroleum ether, and washed free from soap. The solvent and extracted matter is dried with anhydrous sodium sulphate and chilled to 0° C. or lower. Any sterols separating are filtered off. If quantitative removal of sterols is desired, remove the solvent and dissolve residue in ethyl acetate, cool to 0° C. and filter off the precipitated sterol. The solvent is now removed by distillation under vacuum. The undistilled residue is a crude concentrate containing about 17 per cent free tocopherol substantially in the hydroquinone condition. The concentrate may be vacuum distilled or esterified to produce further products of tocopherol.

EXAMPLE II

*Recovery of tocopherol from soy bean oil "hotwell sludge" (the volatile matter of a vegetable oil which is obtained during steam deodorization thereof and which condenses in the barometric sump)*

The hotwell sludge is mixed with 2 per cent of its weight of zinc dust by spading in a trough. The mixture is placed in a tank, preferably of wood or glass, and is steamed to melt the fat, preferably after a wait of 15 minutes or more. The water that separates may be drained away after which the mixture is agitated violently to bring the zinc into suspension. Hydrochloric acid in slight excess of that required to remove the zinc and any soaps is added and the mixture agitated at the boiling point with exclusion of air. The mixture is now allowed to separate, the aqueous acid layer is drawn off, and the supernatant fat is washed with hot water in the absence of air until free from mineral acid and metal soaps. The fat containing the reduced oxidation products of tocopherol is dried and filtered, after which the tocopherol may be distilled under high vacuum. An alternative to this procedure is to use powdered iron or aluminum for the reduction process.

EXAMPLE III

*Treatment of a crude distillate of tocopherol*

A crude distillate of tocopherol obtained from the high vacuum, unobstructed path distillation of a raw oil containing tocopherol, such as corn oil, as described in Hickman and Baxter application No. 201,018 filed April 8, 1938, is taken into solution in ethyl alcohol and chilled to remove sterols. Sodium amalgam in double the amount required to neutralize the free fatty acids is added while the mixture is violently agitated until all free fatty acid is neutralized and the tocopherol oxidation products are reduced. The unreacted sodium is removed. A water insoluble solvent such as ether or petroleum ether is added and the mixture washed with water until free from soap. The solvent is removed by distillation to leave a residue comprising a concentrate of tocopherol and said reduction products of the oxidized tocopherol. The concentrate is used as such or as raw material for further processing.

EXAMPLE IV

*Recovery of tocopherol from "hotwell sludge" from steam deodorization of vegetable oils*

Two samples of the sludge weighing 200 grams each were taken. One of the samples was refined by intimately mixing with 10 grams zinc dust and sufficient 10 per cent hydrochloric acid to completely react with the zinc dust. After completion of the reaction the mixture was washed with water until acid is removed. The material is then dried with anhydrous $Na_2SO_4$ and subjected to distillation in a high vacuum, unobstructed path still.

The other sample was treated with a like amount (200 cc.) 10 per cent hydrochloric acid, washed, dried, and then distilled in the same manner. The course of this distillation is shown in Fig. 1 of the drawing wherein yield of tocopherol is plotted against temperature. It is seen that the tocopherol exhibts two maxima represented by the ordinary and oxidized forms. The recovery of tocopherol was 46.8 per cent.

Figure 2:
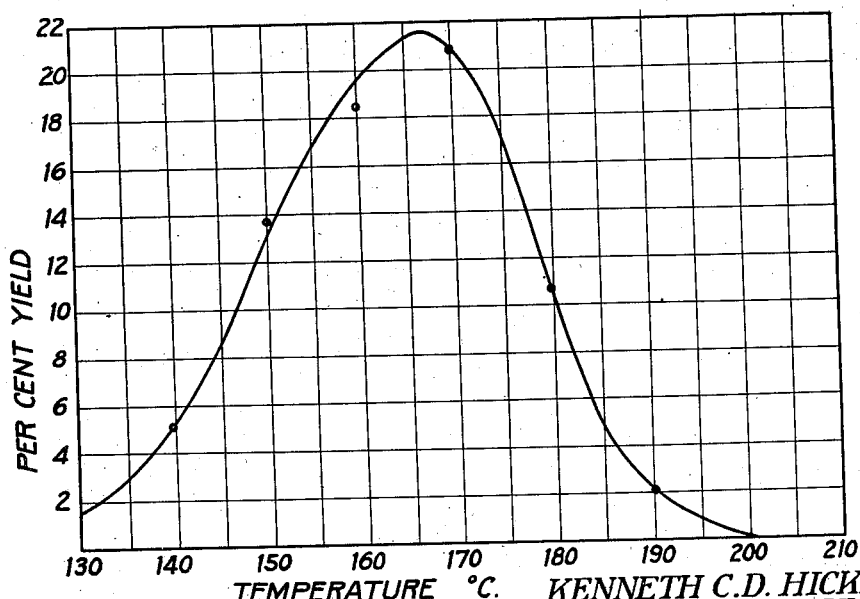

Fig. 2 illustrates the results of the distillation on the first sample after reduction with zinc dust and acid. All of the tocopherol is present in the ordinary or hydroquinone form and can be collected in a more concentrated condition over a narrower temperature range. The recovery of tocopherol was 70.4 per cent.

A mixture of reducing agents may be used if desired. A particularly satisfactory reduction is obtained by employing an active reducing agent which can be reversibly oxidized and reduced, i. e., which can be caused to oscillate between its two redox stages by the action of a second reducing agent. For instance, a mixture of stannous chloride, zinc dust and hydrochloric acts in this manner. The stannous chloride oscillates between the stannous and stannic forms due to the oxidizing action of the quinone and the reducing action of the nascent hydrogen from the zinc and acid.

Tocopherol is known to be a natural antioxidant. However, in the prior art it was believed that the antioxidant power was destroyed by any alkali treatment. While this is the usual case, we have found that tocopherol is not affected by alkali while its oxidation products are and that, if the alkali treatment is carried out in combination with our invention, no loss of antioxidant power will take place. Another advantage of the invention is that the reduction treatment removes materials which would otherwise deposit on the vaporizing surface of the unobstructed path still.

The advantages of the invention cannot be obtained merely by the utilization of an inert gas, thus the use of hydrogen as an inert gas in the absence of a catalyst will not affect the reduction and my invention is not intended to include the mere use of inert gases including hydrogen.

Reference is made to Hickman application 321,913, filed March 2, 1940, which relates to the preparation of tocopherol concentrates from deodorizer scum.

What we claim is:

1. In a process of purifying tocopherol contained in deodorizer scum the steps which comprise subjecting the scum to the action of a purifying and concentrating agent and to a powerful reducing agent which is capable of reducing at least part of the oxidation products of tocopherol into a substance having substantially the same distillation temperature and vitamin E activity as the tocopherol from which said oxidation products were derived, subjecting the reduced tocopherol preparation to high vacuum unobstructed path distillation and separating the tocopherol and its reduced oxidation products as a single fraction at a temperature of about 160° C.

2. In a process for purifying tocopherol contained in a lighter-than-water scum removed from the vapors produced during the carrier gas treatment of a vegetable or animal oil the step which comprises subjecting the scum to the action of a purifying and concentrating agent and to a powerful reducing agent which is capable of converting oxidation products of tocopherol into a substance having substantially the vitamin E activity and distillation temperature of the tocopherol from which said oxidation products were derived.

3. In a process for purifying tocopherol contained in a lighter-than-water scum condensed from the steam utilized for the vacuum-steam deodorization treatment of a vegetable or animal oil the step which comprises subjecting the scum to the action of a purifying and concentrating agent while in the presence of zinc dust and an acid.

4. The process for purifying a crude tocopherol derived from the lighter-than-water scum condensed from the steam utilized in the vacuum-steam deodorization treatment of a vegetable or animal oil which process comprises simultaneously reducing oxidation products of tocopherol which are present in the crude and at the same time treating the crude with an alkali saponifying agent and then separating the non-saponifiable matter.

KENNETH C. D. HICKMAN.
NOEL H. KUHRT.